US011151672B2

(12) United States Patent
Terra et al.

(10) Patent No.: US 11,151,672 B2
(45) Date of Patent: Oct. 19, 2021

(54) ACADEMIC PROGRAM RECOMMENDATION

(71) Applicant: Oracle International Corporation, Redwood Shores, CA (US)

(72) Inventors: Egidio Loch Terra, San Mateo, CA (US); Catherine H. M. Kuo, Danville, CA (US); Paz Centeno, Delray Beach, FL (US); Boonchanh Oupaxay, Mountain House, CA (US); Richard Lee Krenek, Pleasanton, CA (US); David Anthony Madril, Denver, CO (US); Susan Jane Beidler, Oakland, CA (US); Gary Paul Allen, Petaluma, CA (US); James Thomas McKendree, Elizabeth, CO (US)

(73) Assignee: Oracle International Corporation, Redwood Shores, CA (US)

(*) Notice: Subject to any disclaimer, the term of this patent is extended or adjusted under 35 U.S.C. 154(b) by 45 days.

(21) Appl. No.: 15/991,244

(22) Filed: May 29, 2018

(65) Prior Publication Data

US 2019/0114729 A1 Apr. 18, 2019

Related U.S. Application Data

(60) Provisional application No. 62/573,351, filed on Oct. 17, 2017, provisional application No. 62/633,187, filed on Feb. 21, 2018.

(51) Int. Cl.
*G06Q 50/20* (2012.01)
*G06Q 10/10* (2012.01)
(52) U.S. Cl.
CPC ......... *G06Q 50/2053* (2013.01); *G06Q 10/10* (2013.01)

(58) Field of Classification Search
CPC .. G06Q 50/2053; G06Q 10/10; G06Q 50/205; G06Q 10/103
See application file for complete search history.

(56) References Cited

U.S. PATENT DOCUMENTS

| 5,727,950 A | 3/1998 | Cook et al. |
| 6,347,333 B2 | 2/2002 | Eisendrath et al. |
| (Continued) | | |

FOREIGN PATENT DOCUMENTS

| WO | 97/44766 A1 | 11/1997 |
| WO | 01/82150 A2 | 11/2001 |
| (Continued) | | |

OTHER PUBLICATIONS

Murtaugh, Paul A., Leslie D. Burns, and Jill Schuster. "Predicting the retention of university students." Research in higher education 40.3 (1999): 355-371. (Year: 1999).*

(Continued)

*Primary Examiner* — Richard W. Crandall
*Assistant Examiner* — Corey Russ
(74) *Attorney, Agent, or Firm* — Invoke

(57) ABSTRACT

Operations include recommending and presenting academic programs for students. An academic program recommendation model generates recommendations based on a target student's specific characteristics. An academic program is recommended to the target student if the target student's characteristics match the characteristics of other students that have successfully completed the academic program. An academic program is not recommended to the target student if the target student's characteristics match the characteristics of other students that have failed to complete the academic program after some threshold period of time. The system presents an interface for comparing multiple academic programs that have been evaluated in view of a target (Continued)

student's specific characteristics. The interface concurrently lists each of a set of academic programs with a corresponding likelihood of success determined for the target student.

20 Claims, 7 Drawing Sheets

(56) References Cited

U.S. PATENT DOCUMENTS

| | | | |
|---|---|---|---|
| 6,427,063 | B1 | 7/2002 | Cook et al. |
| 7,882,041 | B2 | 2/2011 | Gibbons et al. |
| 8,412,736 | B1 | 4/2013 | Arnold et al. |
| 8,620,831 | B1 | 12/2013 | Adams |
| 8,764,454 | B1 | 7/2014 | Turner |
| 9,299,266 | B2 | 3/2016 | Crawford et al. |
| 9,824,603 | B2 | 11/2017 | Brooke et al. |
| 9,940,606 | B2 | 4/2018 | Madhavan et al. |
| 10,229,100 | B1 | 3/2019 | Lesner et al. |
| 10,607,298 | B1 | 3/2020 | Hanekamp et al. |
| 2004/0009462 | A1 | 1/2004 | McElwrath |
| 2004/0138913 | A1* | 7/2004 | Guerra .............. G09B 7/02 705/327 |
| 2004/0161728 | A1 | 8/2004 | Benevento et al. |
| 2004/0167786 | A1 | 8/2004 | Grace |
| 2004/0181749 | A1 | 9/2004 | Chellapilla et al. |
| 2005/0198563 | A1 | 9/2005 | Kristjansson |
| 2006/0069576 | A1* | 3/2006 | Waldorf ........... G06Q 30/0203 705/7.32 |
| 2006/0252021 | A1 | 11/2006 | Watkins et al. |
| 2006/0265258 | A1 | 11/2006 | Powell et al. |
| 2009/0035733 | A1 | 2/2009 | Meitar et al. |
| 2009/0081629 | A1 | 3/2009 | Billmyer et al. |
| 2009/0083638 | A1 | 3/2009 | Gupta |
| 2009/0197234 | A1 | 8/2009 | Creamer et al. |
| 2010/0009330 | A1 | 1/2010 | Yaskin |
| 2010/0009331 | A1 | 1/2010 | Yaskin et al. |
| 2010/0009332 | A1 | 1/2010 | Yaskin et al. |
| 2010/0159438 | A1* | 6/2010 | German ........... G06F 16/24573 434/433 |
| 2010/0223194 | A1 | 9/2010 | Adams |
| 2011/0270684 | A1 | 11/2011 | Holtzman |
| 2012/0233083 | A1 | 9/2012 | Strodtman et al. |
| 2012/0233084 | A1 | 9/2012 | Sardonis et al. |
| 2012/0233108 | A1 | 9/2012 | Stober et al. |
| 2013/0011821 | A1 | 1/2013 | Denley |
| 2014/0052663 | A1* | 2/2014 | Kelley .............. G06Q 30/0282 705/347 |
| 2014/0074896 | A1 | 3/2014 | Bushman et al. |
| 2014/0188442 | A1 | 7/2014 | Zelenka et al. |
| 2014/0195549 | A1* | 7/2014 | Ahn ................ G06F 16/9535 707/749 |
| 2014/0205987 | A1* | 7/2014 | Habermehl ........... G09B 7/02 434/350 |
| 2014/0279620 | A1 | 9/2014 | Lillquist et al. |
| 2014/0379602 | A1 | 12/2014 | Nelson et al. |
| 2015/0066559 | A1* | 3/2015 | Brouwer ........... G06Q 50/2053 705/7.21 |
| 2015/0134556 | A1 | 5/2015 | Spinner et al. |
| 2015/0149379 | A1 | 5/2015 | Dearmon |
| 2015/0149380 | A1* | 5/2015 | Kulkarni ............ G06Q 10/10 705/327 |
| 2015/0205777 | A1 | 7/2015 | Campanelli et al. |
| 2015/0220880 | A1* | 8/2015 | Maipady ........... G06Q 50/2053 705/327 |
| 2015/0248739 | A1* | 9/2015 | Schulman ............ G09B 5/00 434/322 |
| 2015/0317604 | A1 | 11/2015 | Bubna et al. |
| 2016/0071424 | A1 | 3/2016 | Harney et al. |
| 2016/0085754 | A1* | 3/2016 | Gifford ............. G16H 50/30 707/723 |
| 2016/0140679 | A1 | 5/2016 | Segal et al. |
| 2016/0275634 | A1 | 9/2016 | Singh et al. |
| 2016/0371805 | A1 | 12/2016 | Knotts et al. |
| 2017/0004453 | A1 | 1/2017 | Lin et al. |
| 2017/0154308 | A1 | 6/2017 | Duerr et al. |
| 2017/0256172 | A1* | 9/2017 | Kil ................. G06Q 10/06393 |
| 2017/0316528 | A1* | 11/2017 | Willcox ............... G09B 5/00 |
| 2017/0365023 | A1 | 12/2017 | Cox et al. |
| 2018/0052919 | A1* | 2/2018 | Feldman ........... G06Q 30/0623 |
| 2018/0130155 | A1 | 5/2018 | Oni et al. |
| 2018/0189911 | A1 | 7/2018 | Al-Sulaiman et al. |
| 2018/0276205 | A1* | 9/2018 | Auger ................ G09B 5/00 |
| 2018/0293679 | A1 | 10/2018 | Bai et al. |
| 2018/0293905 | A1 | 10/2018 | Benz |
| 2018/0350016 | A1* | 12/2018 | Ward ............... G06F 16/951 |
| 2018/0366021 | A1 | 12/2018 | Zertuche |
| 2019/0080628 | A1 | 3/2019 | Olsen |

FOREIGN PATENT DOCUMENTS

| | | |
|---|---|---|
| WO | 2003/100560 A2 | 12/2003 |
| WO | 2004/023329 A1 | 3/2004 |
| WO | 2013/066868 A1 | 5/2013 |

OTHER PUBLICATIONS

Maryalene LaPonsie, "The High School Student's Guide College Admissions", retrieved from https://web.archive.org/web/20161013154233/https://www.accreditedschoolsonline.org/resources/college-admissions-guide/; www.accreditedschoolsonline.org (Year: 2016).

Tristan Denley, Degree Compass: A Course Recommendation System, EDUCASE, Nov. 23, 2017.

Grewal DS, Kaur K (2016) Developing an Intelligent Recommendation System for Course Selection by Students for Graduate Courses. Bus Eco J 7209. doi:10.4172/2151-6219.1000209.

Even your academic advisor might one day be a robot, retrieved from https://www.engadget.com/2016/01/14/your-academic-advisor-might-one-day-be-a-robot/.

Chatbot helps students choose courses, retrieved from http://www.bbc.com/news/technology-40960426.

Al-Badarenah and Alsakran, An Automated Recommender System for Course Selection, International Journal of Advanced Computer Science and Applications, vol. 7, No. 3, pp. 166-175, 2016.

Hurwitz, "The impact of legacy status on undergraduate admissions at elite colleges and universities", 2009, retrieved from https://scholar.harvard.edu/files/btl/files/michaelhurwitz_-_qp_12-12-09.pdf (Year: 2009).

Thomas Lux, et al., "Applications of Supervised Learning Techniques on Undergraduate Admissions Data", 2016, retrieved from https://dl.acm.org/doi/pdf/10.1145/2903150.2911717 (Year: 2016).

Waters et al., "GRADE: Machine Learning Support for Graduate Admissions", 2013, Proceedings of the Twenty-Fifth Innovative Applications of Artificial Intelligence Conference (Year: 2013).

Aasheim et al., Knowledge and skill requirement for entry level IT workers, Journal of Information Systems Education, vol. 20(3), pp. 349-356 (Year: 2009).

Aher, Sunita B., and L. M. R. J. Lobo. "Combination of machine learning algorithms for recommendation of courses in E-Learning System based on historical data." Knowledge-Based Systems 51 (2013): 1-14. (Year: 2013).

Brzozowski, Mike, etal. "groupTime: preference based group scheduling." Proceedings of the SIGCHI conference on Human Factors in computing systems. 2006. (Year: 2006).

Liao, Soohyun Nam, et al. "A robust machine learning technique to predict low-performing students." ACM Transactions on Computing Education (TOCE) 19.3 (2019): 1-19. (Year: 2019).

Wang, Yen-Zen. "Using genetic algorithm methods to solve course scheduling problems." Expert Systems with Applications 25.1 (2003): 39-50. (Year: 2003).

Tsai et al., "Ontology-Mediated Integration of Intranet Web Services," Computer, p. 63-71, copyright 2003 IEEE. (Year: 2003).

Aguiar, E., Identifying students at risk and beyond: A machine learning approach (Order No. 3733723). Available from ProQuest Dissertations and Theses Professional. (1749024112), Jul. 2015. (Year: 2015).

(56) References Cited

OTHER PUBLICATIONS

Burke, Hybrid Recommender Systems: Survey and Experiments User Modeling and User-Adapted Interaction, 2002, pp. 1-30 (Year: 2002).

De Pessemier, Social Recommendations for Events, Ghent University, 2013, pp. 1-4 (Year: 2013).

Herzog, Spontaneous Event Recommendations on the Go, DMRS, 2015, pp. 1-4 (Year: 2015).

Wang, Enhanced Group Recommender System and Visualization, Doctoral Thesis, University of Technology Sydney, 2016, pp. 1-190 (Year: 2016).

\* cited by examiner

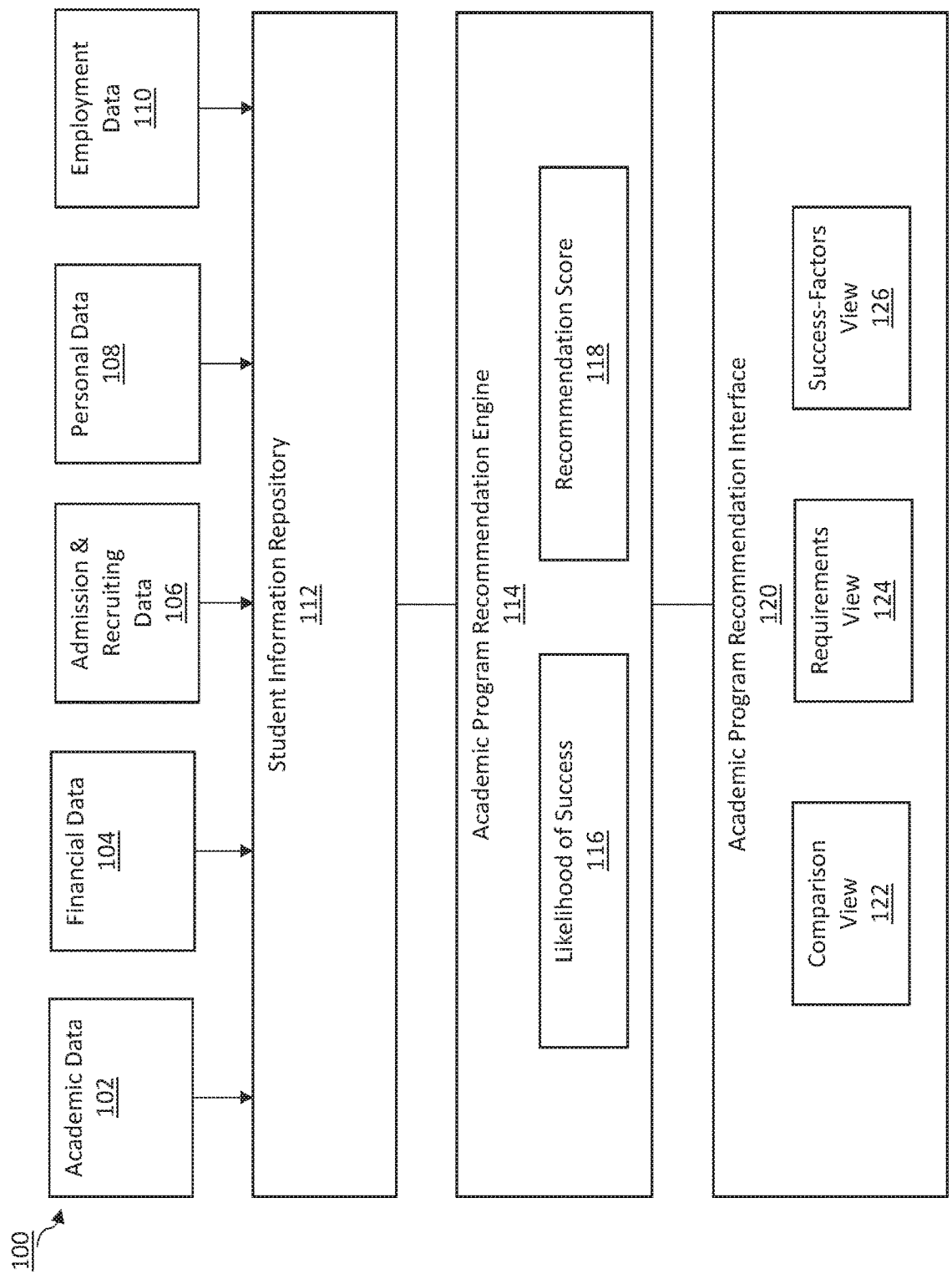

VISION COLLEGE

Chris Sanchez
Sophomore
BS Nursing

[View in Planner]

| | 17 | 24/120 | 24 | 3.4 |
|---|---|---|---|---|
| | Units In-progress | Units Completed | Course Count | Overall GPA |

General Education: 19/45  Major Units: 0/55  Electives: 5/20

Time left: 6 academic periods       Financial Aid: XXXX
Investment to graduation: $24,000.00
Financials: $4,000.00 paid so far Other Majors you might be interested ○ All (5)  ● High (2)  ○ Med (1)  ○ Low (1)

Health Science, B.Sc.
Admission Requirements   17/120    11
                          Units Completed   Courses Count
Time to graduate: 6 academic periods              13
Investment to graduate: $24,750.00     Courses Not Used Success Likelihood: High
[View in Planner]

Likelihood Factors  ✕
Health Science, B.Sc.
• 70% graduate in 4-6 years
• 15% graduate in other major
• Courses used   • Related Courses
• GPA            • Progress
• HS Subjects    • Interest Survey
• Similar cost to graduation

222

224

Job Market: Medium
Employability: High
Average Salary: $50,000.00

Kinesiology, B.Sc.
Admission Requirements   12/120    9
                          Units Completed   Courses Count
Time to graduate: 7 academic periods              15
Investment to graduate: $29,800.00     Courses Not Used Success Likelihood: High
[View in Planner]

Health Admistration, B.A.
Admission Requirements   11/120    7
                          Units Completed   Courses Count
Time to graduate: 7 academic periods              17
Investment to graduate: $30,820.00     Courses Not Used Success Likelihood: Medium
[View in Planner]

Job Market: Medium  Average Salary: $60,000.00
Employability: Medium

Human Development A.A.
Admission Requirements   7/70     4
                          Units Completed   Courses Count
Time to graduate: 4 academic periods              20
Investment to graduate: $10,840.00     Courses Not Used Success Likelihood: Low
[View in Planner]

Job Market: Medium  Average Salary: $40,000.00
Employability: Low

[Done]

FIG. 2C

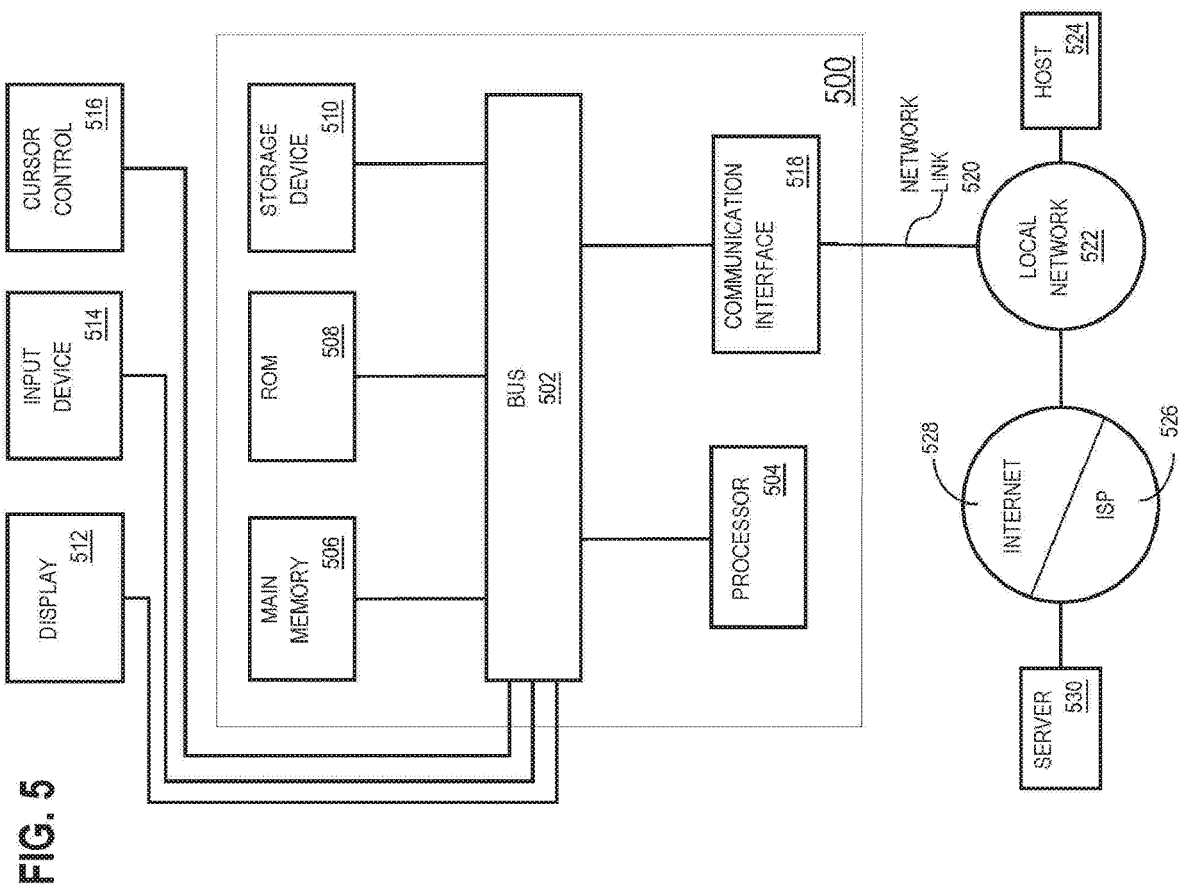

ACADEMIC PROGRAM RECOMMENDATION

BENEFIT CLAIMS; INCORPORATION BY REFERENCE

This application claims the benefit of U.S. Provisional Patent Application No. 62/573,351, filed Oct. 17, 2017, and U.S. Provisional Patent Application No. 62/633,187, filed Feb. 21, 2018, which are hereby incorporated by reference.

TECHNICAL FIELD

The present disclosure relates to higher education. In particular, the present disclosure relates to recommending academic programs for a student.

BACKGROUND

An academic program is course of study associated with an academic discipline. Academic programs are common in higher-education institutions. Typically, to receive a degree or certificate in a particular academic discipline, a student must complete requirements associated with a corresponding academic program. Academic programs may include, for example, majors, minors, degree programs, and certificate programs. Examples of majors include biology, English, and health science. An academic program may be associated with a particular degree, such as a bachelor of science or master of fine art degree.

A student may enroll in or declare an academic program, committing to complete the requirements associated with that academic program. Prior to enrolling in the academic program, the student may have an undeclared status. By allowing students to have an undeclared status, institutions give students flexibility to choose an academic path as the students mature and are exposed to different subjects. However, if a student completes many academic periods without choosing an academic program, the student will likely choose courses that will not be used towards a degree or certificate. Timely selection of an academic program can decrease costs for a student.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1 illustrates a system in accordance with one or more embodiments;

FIG. 2B illustrates a requirements view of an academic program recommendation interface in accordance with one or more embodiments;

FIG. 2C illustrates a success-factors view of an academic program recommendation interface in accordance with one or more embodiments;

FIG. 5 shows a block diagram that illustrates a computer system in accordance with one or more embodiments.

DETAILED DESCRIPTION

Figure 2A:
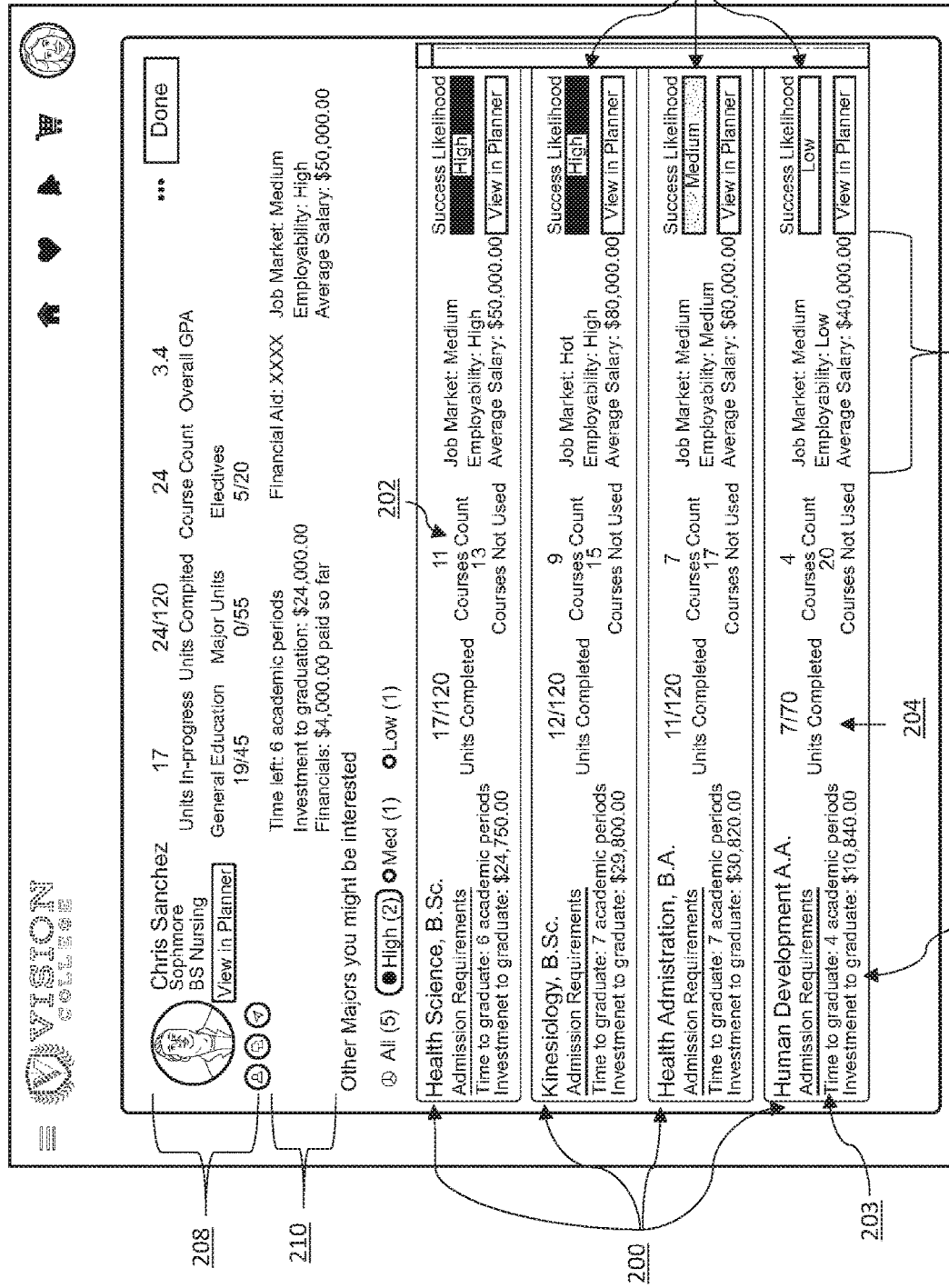
FIG. 2A illustrates a comparison view of an academic program recommendation interface in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ACADEMIC PROGRAM RECOMMENDATION INTERFACE
4. SELECTING RECOMMENDED ACADEMIC PROGRAMS
5. DISPLAYING RECOMMENDED ACADEMIC PROGRAMS
6. MISCELLANEOUS; EXTENSIONS
7. HARDWARE OVERVIEW

1. General Overview

Academic programs may include, for example, majors, degree programs, minors, and certificate programs. Some embodiments recommend and present academic programs for students. An academic program recommendation model generates recommendations based on a target student's specific characteristics. An academic program is recommended to the target student if the target student's characteristics match the characteristics of other students that have successfully completed the academic program. An academic program is not recommended to the target student if the target student's characteristics match the characteristics of other students that have failed to complete the academic program after some threshold period of time.

Some embodiments present an interface for comparing multiple academic programs that have been evaluated in view of a target student's specific characteristics. The interface concurrently lists each of a set of academic programs with a corresponding likelihood of success determined for the target student. The likelihood of success may correspond to the target student's likelihood of completing the academic program within a particular amount of time or with a particular Grade Point Average (GPA). The likelihood of success may correspond to the target student's likelihood of obtaining employment upon completing the academic program. Furthermore, the interface may concurrently list student-specific objectives still to-be-completed by the target student for each of the set of academic programs. As an example, the interface may concurrently list, for each of the set of academic programs, a number of courses, a number of credits, an estimated expense, or an estimated amount of time necessary for completion by the target student.

Some embodiments described in this Specification and/or recited in the claims may not be included in this General Overview section.

2. System Architecture

FIG. 1 illustrates an academic program recommendation system 100 in accordance with one or more embodiments. As illustrated in FIG. 1, the system 100 includes a student information repository 112, academic program recommendation engine 114, and academic program recommendation interface 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Academic programs, recommended by the system 100, may include academic programs at higher education institutions. As an example, an academic program may be a major or minor, such as math, English, or chemistry. Alternatively, or additionally, an academic program may correspond to a degree program such as an Associate of Arts (A.A.), English program or a Master of Science (M.S.), biology program. As another example, an academic program may be a field of study for continuing education, such as a certificate program in software development or accounting.

In an embodiment, the student information repository 112 is any type of storage unit and/or device (e.g., a file system, collection of tables, or any other storage mechanism) for storing data. Further, the student information repository 112 may include multiple different storage units and/or devices. The multiple different storage units and/or devices may or may not be of the same type or located at the same physical site. Further, the student information repository 112 may be implemented or may execute on the same computing system as the academic program recommendation engine 114 and academic program recommendation interface 120. Alternatively, or additionally, the student information repository 112 may be implemented or executed on a computing system separate from the academic program recommendation engine 114 and academic program recommendation interface 120. The student information repository 112 may be communicatively coupled to the academic program recommendation engine 114 and academic program recommendation interface 120 via a direct connection or via a network.

In an embodiment, the student information repository 112 is populated with student information from a variety of sources and/or systems. The student information repository 112 may be populated with student data such as academic data 102, financial data 104, admission and recruiting data 106, personal data 108, and employment data 110. The student data may be structured (e.g. a table). Alternatively, or additionally, the student data may be unstructured (e.g. text or social media posts).

In some embodiments, academic data 102 includes records from a student's prior and/or current educational institutions. The academic data may be collected by a university from the student. The academic data may be collected from the student's current or prior educational institutions. As an example, the student information repository 112 may be connected with a records department of a university. The student information repository may be populated with academic data 102 from the records department. The academic data 102 may include college records for a student such as courses completed and grades earned. The academic data 102 may include academic records from other higher-learning institutions. The academic data 102 may further include standardized test scores for the student. The academic data 102 may include any information about a student's prior or current courses such as grades, enrollment status, class size, feedback, evaluations, attendance, professors, and participation scores.

In some embodiments, the financial data 104 may include information about a tuition amount a student has paid and/or is projected to pay. The financial data 104 may include an amount paid by a student to date. The financial data 104 may include the cost of attendance per academic unit (e.g., cost per course or course unit). The financial data 104 may include the cost of attendance per academic period (e.g., cost per semester). The financial data 104 may include financial aid granted and/or available to the student. The student information repository may be populated with financial data 104 from a financial department of a university.

In some embodiments, the student information repository may be populated with admission and recruiting data 106 from the admission and/or recruiting departments of a university. The admission and recruiting data 106 may include information obtained by a recruiter, such as a prospective student's schools of interest. The admission and recruiting data 106 may include information submitted by a student as a part of a formal application. The admission and recruiting data 106 may include demographic information provided by a student in an admission application. The admission and recruiting data 106 may include an essay submitted by a student as part of an admission application. The admission and recruiting data 106 may include interests specified in the application, such as housing interests and sports interests.

In some embodiments, employment data 110 may include statistics about employment in relation to one or more academic programs. The employment data 110 may include employment statistics for students that completed a particular academic program. The employment data 110 may include salary data for students that completed a particular academic program. The student information repository may be populated with employment data 110 from a career services department of a university. Employment data 110 may be obtained from alumni surveys. Alternatively, or additionally, employment data 110 may be obtained from the human resources departments of various companies. Alternatively, or additionally, employment data 110 may be obtained from employment-related websites or databases.

In one or more embodiments, personal data 108 may include information about any activity performed by a student. As an example, personal data 108 may include browser history indicating that a student has visited the university's website. Personal data 108 may further include browser history indicating third-party websites that the student has visited. As another example, personal data 108 may include information about the student winning first place in an engineering competition. As another example, personal data 108 may include a social media post, made by the student, indicating an interest in sculpting. Personal data 108 may further include biodemographic data, such as a student's race which was self-reported in a survey. As another example, personal data 108 may indicate that a student is a first-generation college attendee. Personal data 108 may include student information obtained from a third-party database.

In an embodiment, the academic program recommendation engine 114 is hardware and/or software configured to identify academic programs to recommend to a target student. The academic program recommendation engine 114 may identify academic programs for recommendation based on student information stored in the student information repository 112.

In an embodiment, the academic program recommendation engine 114 determines a recommendation score 118 for an academic program with respect to a target student. The recommendation score 118 may be a numerical value indicating whether the academic program should be recommended for the target student. As an example, the recommendation score 118 may be a number from one to ten.

The academic program recommendation engine 114 may use one or more models to compute a recommendation score 118 for a target student in relation to a particular academic program. Based on the recommendation score, the academic program recommendation engine 114 selects academic programs to recommend to the target. The system may organize the data into tabular form, classes, and/or categories, to enable data analysis via the model(s).

The academic program recommendation engine 114 may base the recommendation score 118 on a comparison of (a) the student data associated with the target student and (b) historical data associated with prior students. As an example, prior students that have expressed an interest in art and design have high graduation rates in the architecture major. Based on a target student's interest in art and design, and the correlation between an art and design interest and success in the architecture major, the system increases the target student's recommendation score for the architecture major. The recommendation score 118 for a current student may be directly proportional to the number of attributes in common with previously successful students. The academic program recommendation engine 114 may compare attributes based on any student data stored to the student information repository 112.

Alternatively, or additionally, the academic program recommendation engine 114 may determine the recommendation score 118 by comparing (a) student data associated with the target student with (b) completion requirements for the target student based on requirements of the academic program. The completion requirements for the target student may include a number of course credits or hours earned by the target student that are applicable to the requirements of the particular academic program. The completion requirements for the target student may comprise a set of courses completed by the target student that satisfy requirements of the particular academic program. The completion requirements for the target student may comprise non-course requirements that satisfy the requirements of the particular academic program. Non-course requirements may include a mandatory internship and/or extra-curricular activities. Non-course requirements may include milestones, such as a thesis or capstone project.

Additionally, the academic program recommendation engine 114 may determine a likelihood of success 116 for the target student with respect to one or more academic programs. The likelihood of success 116 may correspond to the student's likelihood of completing the academic program within a particular amount of time. Alternatively, or additionally, the likelihood of success 116 may correspond to the student's likelihood of completing the academic program with a particular Grade Point Average (GPA). Alternatively, or additionally, the likelihood of success 116 may correspond to the student's likelihood of obtaining employment upon graduating. The likelihood of success 116 for a target student with respect to an academic program may be identified by comparing the target student's characteristics to characteristics associated with prior students that have succeeded in the academic program. The recommendation score 118 may be based, in whole or in part, on the likelihood of success 116. As an example, the system computes a likelihood of success 116 based on a target student's shared characteristics with psychology Bachelor of Science (B.S.) graduates. The system increments the likelihood of success 116, based on the target student's completed courses which count towards the psychology B.S., to compute a recommendation score 118.

In some embodiments, the academic program recommendation engine 114 may determine whether to recommend, or refrain from recommending, an academic program. The academic program recommendation engine 114 determines whether to recommend a particular academic program based on the recommendation score for the particular academic program. The academic program recommendation engine may compare the recommendation score to a threshold value to determine whether to recommend the academic program corresponding to the recommendation score. The system may store different threshold values for recommending academic programs. For example, the threshold value may be set to fifty for liberal arts programs and sixty for engineering programs.

In an embodiment, the academic program recommendation interface 120 is a Graphical User Interface (GUI) configured to display a list of academic programs. As an example, the academic program recommendation interface 120 may display information to a student to help the student to choose an academic program. The academic program recommendation interface 120 may concurrently identify multiple recommended academic programs with respective information about each program. As another example, the academic program recommendation interface 120 may display information to a counselor. The information may allow a counselor to better assist the student in selecting an academic program. The academic program recommendation interface 120 may display student data in relation to each of the set of recommended academic programs that are concurrently displayed. The academic program recommendation interface 120 may obtain the student data from the student information repository 112 or from the academic program recommendation engine 114.

Different components of the academic program recommendation interface 120 may be specified in different languages. The behavior of user interface elements may be specified in a dynamic programming language, such as JavaScript. The content of user interface elements may be specified in a markup language, such as hypertext markup language (HTML) or extensible markup language (XML) User Interface Language (XUL). The layout of user interface elements may be specified in a style sheet language, such as Cascading Style Sheets (CSS). Alternatively, the academic program recommendation interface 120 may be specified in one or more other languages, such as Java, C, or C++.

The academic program recommendation interface 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

In an embodiment, the academic program recommendation interface 120 includes, is triggered by, or is managed by a virtual assistant (not pictured). The virtual assistant presents information reactively (in response to a request for the information) or proactively (without a specific request for the information). The virtual assistant may periodically identify a set of students that have not enrolled in an academic program. Alternatively, or additionally, the virtual assistant may periodically identify a set of students that are (a) enrolled in an academic program different than the particular academic program and (b) not performing according to a minimum performance criterion. As an example, the virtual assistant may identify students with low GPAs. A low GPA may indicate that the student should choose a different academic program in which the student may be more successful. In response to identifying a student that should choose an academic program, the virtual assistant may present a notification. The virtual assistant may present the notification with a link to the academic program recommendation interface 120. Alternatively, or additionally, the virtual assistant may directly present the list of recommended academic programs.

3. Academic Program Recommendation Interface

Figure 2B:
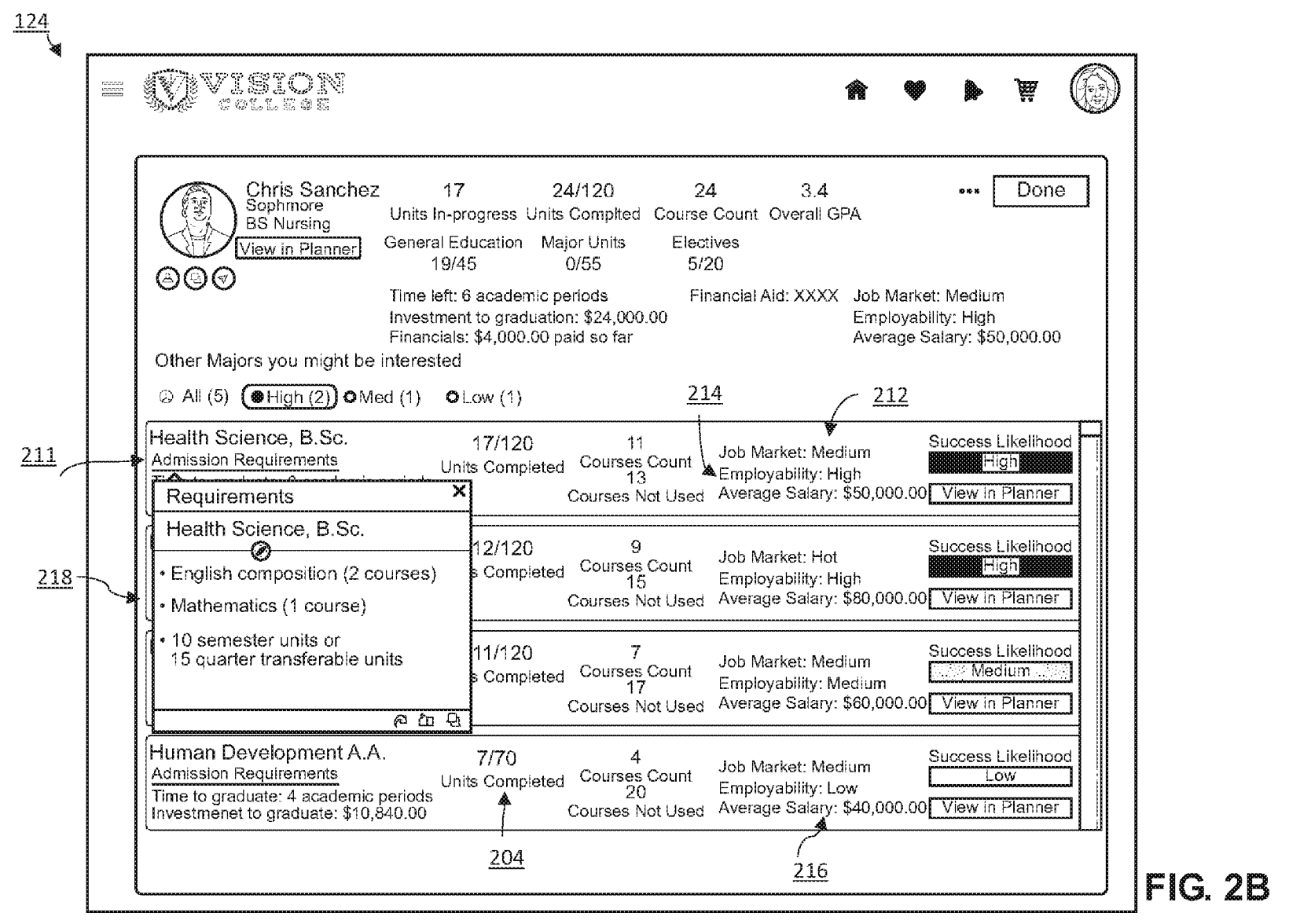

FIGS. 2A-2C illustrate examples of an academic program recommendation interface 120 in accordance with one or more embodiments. Operations described with respect to one component may instead be performed by another component. As illustrated in FIG. 2A, the academic program recommendation interface 120 includes a comparison view 122, a requirements view 124, and a success-factors view 126. The academic program recommendation interface 120 may display information at various levels of granularity. The academic program recommendation interface 120 may switch views, responsive to user input, to allow a user to drill down into statistics about a selected academic program.

A. Comparison View

An example of the comparison view 122 is shown in FIG. 2A. The comparison view 122 may include data in relation to each of a set of recommended academic programs 200 that are concurrently displayed. A comparison view may include, for example, a number of courses, or non-course requirements, that are completed by the student and required for a recommended academic program. As illustrated in FIG. 2A, the comparison view 122 presents a number of completed courses 202 which are applicable for completion of each recommended program. The comparison view 122 may further present a number of courses completed by the student which do not count towards a recommended academic program. The comparison view may further include a number of course credits completed (e.g. units completed 204) by the student that meet the course credit requirements for a recommended academic program.

The comparison view 122 may include an expected time 203 for the student to complete the requirements for the academic program. As an example, the comparison view 122 displays "Time to graduate: 4 academic periods." The comparison view 122 may include an expected expense 205 for the student to complete the remaining requirements for the academic program. As an example, the comparison view 122 displays: "Investment to graduate: $10,840." The system may determine the expected time and/or expense based on analysis of the student's academic data and/or financial data. As an example, the system computes the expected expense for the student to complete the remaining requirements for the academic program by multiplying the number of academic periods required to complete the remaining requirements for the academic program by the cost of attendance per academic period.

The comparison view may include employment statistics 206 corresponding to the academic programs. Employment statistics may include a job market rating 212, employability rating 214, and/or average salary 216, as shown in FIG. 2B. The job market rating 212 may qualitatively or quantitatively assess the demand for employees that completed an associated academic program. For example, the job market rating 212 may be "hot" or "medium." The employability rating 214 may qualitatively or quantitatively assess the percentage of people that are employed within a certain period of completing an academic program. As an example, if eighty-five percent of graduates from an academic program are employed within six months of graduation, the employability rating 214 is "high." The comparison view may display salary statistics such as an average salary 216 for students that completed an academic program. Additional salary statistics that the comparison view may display include salary percentiles. For example, the interface displays a ninetieth percentile salary, fiftieth percentile salary, and twentieth percentile salary, for recent graduates of the health science, Bachelor of Science B.S. program.

Returning to FIG. 2A, the comparison view 122 may include student data 208 corresponding to the target student for which the academic programs are being recommended. As an example, the comparison view displays the name of the student, the student's academic year (e.g. Freshman or Sophomore), and the student's declared academic program, if any.

If the student is enrolled in an academic program, the comparison view may display information about the target student's progress in that academic program 210. As shown in FIG. 2A, the comparison view 122 displays the student's units in-progress in the student's current Nursing major (seventeen). The comparison view further includes the student's units completed, compared to the total units required for the Nursing major (twenty-four completed/one hundred twenty total). The comparison view 122 may further display financial information based on the student's current academic program. Financial information based on the student's current academic program may include the student's projected cost to complete the requirements for the academic program. The comparison view 122 may further include employment information, such as employability and average salary, for students that completed the student's current academic program.

The comparison view 122 may include a likelihood of success 116 for each of the set of recommended academic programs. The likelihood of success 116 may be displayed qualitatively. As an example, for each of the recommended academic programs, the interface displays: Success Likelihood: High/Medium/Low. Alternatively, or additionally, the likelihood of success 116 may be displayed quantitatively. As an example, for a recommended academic program, the interface displays: Success Likelihood: 0.3. The likelihood of success 116 may be color-coded. As an example, high is displayed in green, medium is displayed in yellow, and low is displayed in red.

B. Requirements View

An example of a requirements view 124 is shown in FIG. 2B. In response to user activation of a button or link labeled "Admission Requirements," 211 the academic program recommendation interface may transition to a requirements view 124. The requirements view 124 may include some or all information in the comparison view 122, along with detailed information about the admission requirements 218 for the selected academic program. The displayed admission requirements 218 may include courses required for admission to the associated academic program. As an example, for admission to a health science major, a student must have completed two courses in English composition, one course in mathematics, and ten total semester units. Additionally, the displayed admission requirements 218 may include courses completed by the student in relation to the academic program requirements. For example, the interface displays "6/10 units completed," indicating that the target student has completed six of the ten semester units required to initiate an academic program. The requirements view 124 may be presented as a pop-up window over the comparison view 122.

C. Success-Factors View

An example of a success-factors view 126 is shown in FIG. 2C. In response to user activation of a button or link labeled "Success Likelihood," 222 the academic program recommendation interface may transition to a success-factors view 126. The success-factors view 126 may include some or all information in the comparison view 122, along with detailed information about the student's likelihood of success 116 in the selected academic program.

The success-factors view 126 includes student-specific values for each of a set of likelihood factors 224 used to determine the target student's likelihood of success in a particular academic program. The likelihood factors 224 may correspond to characteristics of the target student that are associated with previous students that succeeded in the academic program. The academic program recommendation interface may display a subset of factors, used to determine the target student's likelihood of success in the academic program, which were most determinative in the likelihood of success calculation. Alternatively, the academic program recommendation interface all factors used to determine the target student's likelihood of success in the academic program.

The success-factors view may include qualitative or quantitative values corresponding to each likelihood factor 224. The success-factors view may include color codes. As an example, the system may use green to indicate a very positive influence, yellow to indicate a positive influence, and red to indicate a negative influence. A student's GPA highly correlates with the GPAs of students who have successfully completed a health science B.S. program. Accordingly, the academic program recommendation interface displays a green icon next to "GPA," indicating that GPA was a factor that strongly affected the recommendation of the health science B.S. program. The target student's completed High School (HS) subjects are not similar to the completed high school subjects of students who successfully completed the health science B.S. program. Accordingly, the academic program recommendation interface displays a red icon next to "HS Subjects," indicating that the high school subjects had a negative influence on the likelihood of success. Alternatively, or additionally, the academic program recommendation interface may display quantitative values corresponding to each factor. As an example, the academic program recommendation interface displays "60% similar" next to "Interest Survey," indicating a 60% similarity between the student's interests and prior successful students' interests.

The academic program recommendation interface may further include a button labeled "View Plan." Responsive to user interaction with the "View Plan" button, the academic program recommendation interface may display a course planner corresponding to the corresponding academic program. Displaying a course planner is described in U.S. Provisional Patent Application No. 62/566,394, Event Management System, incorporated by reference herein.

In an embodiment, the academic program recommendation interface includes elements which accept user input to sort or filter the recommended academic programs. As an example, responsive to detecting user interaction with a button displayed above salary data, the system sorts a set of recommended academic programs. The system displays the academic programs in order, from the academic program with the highest average salary to the academic program with the lowest average salary. As another example, responsive to detecting user interaction with a slider button, the system filters a set of recommended academic programs. The system only displays recommended academic programs for which the student can complete the required classes while paying less than $50,000.

4. Selecting Recommended Academic Programs

Figure 3:
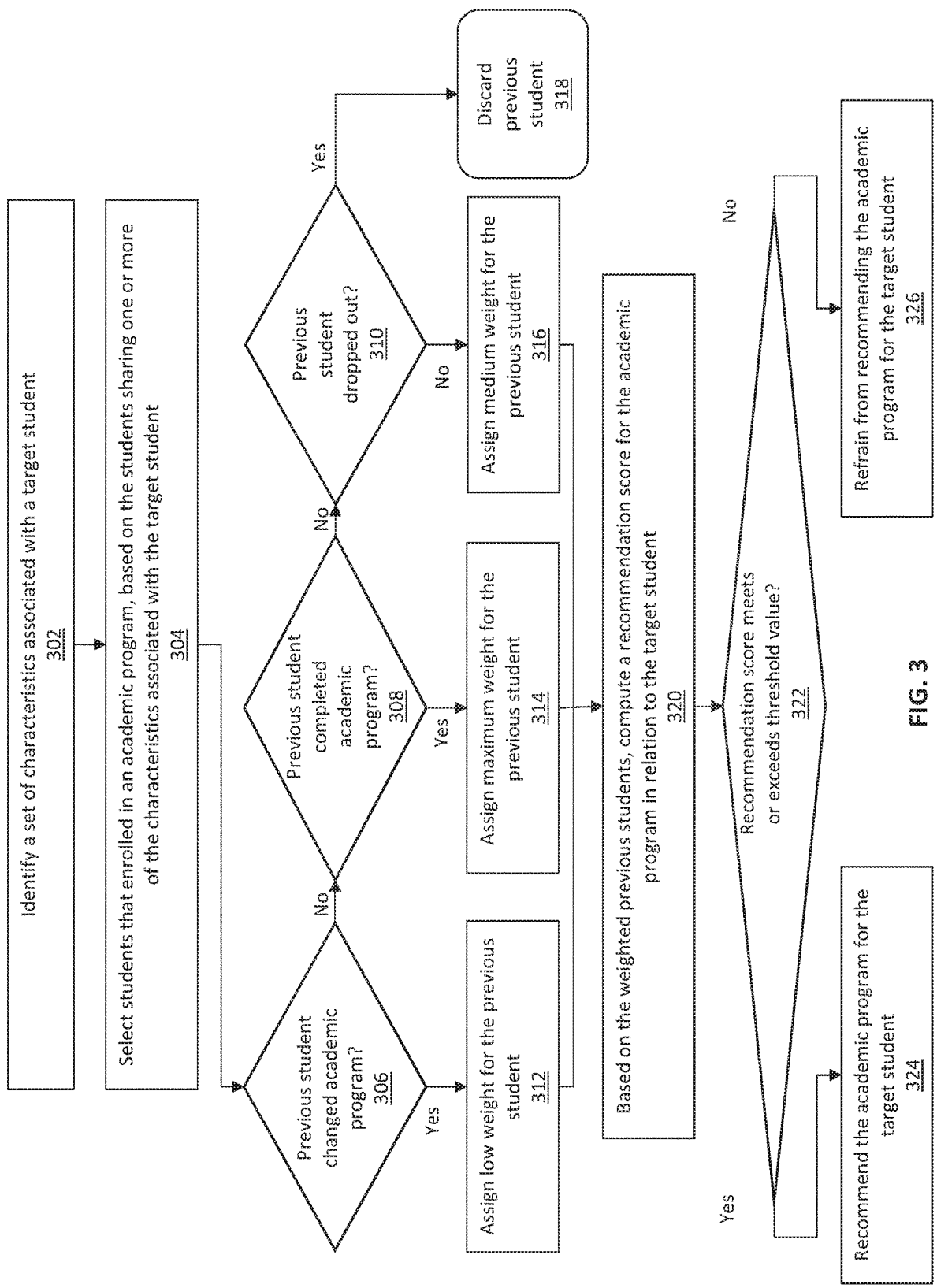
FIG. 3 illustrates example operations for recommending an academic program for a target student in accordance with one or more embodiments.

FIG. 3 illustrates an example set of operations for identifying academic programs to recommend to a target student in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In some embodiments, the academic program recommendation engine identifies a set of characteristics associated with a target student (Operation 302). The academic program recommendation engine may identify the set of characteristics, associated with the target student, by querying the student information repository. The system may identify the characteristics based on one or more of the academic data, financial data, admission and recruiting data, personal data, and employment data, pertaining to the target student.

In some embodiments, the academic program recommendation engine identifies a set of students, that share one or more of the characteristics associated with the target student, that enrolled in an academic program (Operation 304). The academic program recommendation engine may identify the set of students by querying the student information repository. As an example, the target student is a first-generation college student. The academic program recommendation engine queries the student information repository to identify a set of students that are known to be first-generation college students. The academic program recommendation engine selects a subset of the set of first-generation college students that have declared a legal studies major. The academic program recommendation engine may identify the set of students based on ranges or categories corresponding to characteristics associated with the target student. As an example, the target student has a GPA of 3.1. The academic program recommendation engine queries the student information repository to identify other students with GPAs in the range of 3.0 to 3.2.

The academic program recommendation engine may group the students based on an outcome. As an example, the academic program recommendation engine identifies previous students that completed the academic program, changed academic program, or dropped out.

In some embodiments, the academic program recommendation engine determines whether a previous student, of the selected set of students, changed to a different academic program (Operation 306). The academic program recommendation engine may determine whether a particular student changed to a different academic program by querying the student information repository. Students that changed to a different academic program may include, for example, a student that changed from a biology major to a psychology major. As another example, students that changed to a different academic program may include a student that changed from a B.S., chemistry degree program to a B.S., chemical engineering degree program.

In some embodiments, the academic program recommendation engine determines whether a previous student, of the selected set of students, completed the academic program (Operation 308). The academic program recommendation engine may query the student information repository to identify students that completed an academic program by graduating or earning a certificate. Alternatively, or additionally, the academic program recommendation engine may identify students that have completed the academic program within a threshold period of time. As an example, the academic program recommendation engine determines whether a previous student graduated with an English degree within six years.

In some embodiments, the academic program recommendation engine determines whether a previous student, of the selected set of students, dropped out (Operation 310). The academic program recommendation engine may determine whether a previous dropped out of the academic institution by querying the student information repository.

Upon determining whether the previous student completed the academic program, changed academic program, dropped out, or none of the above, the academic program recommendation engine may assign a weight for the previous student. The weight may represent the previous student's fit to, and/or likelihood of success in, the academic program.

In some embodiments, if the previous student changed academic program, then the academic program recommendation engine assigns a low weight for the previous student (Operation 312). When a student changes from a first academic program to a second academic program, the change may be indicative of a poor fit to the first academic program. Accordingly, a low weight may be appropriate for students that changed academic program. The low weight may be used to tailor the model to be less likely to recommend the academic program to the target student when previous students that share characteristics associated with the target student changed to a different academic program.

In some embodiments, if the previous student completed the academic program, then the academic program recommendation engine assigns a maximum weight for the previous student (Operation 314). When a student completes an academic program, the completion is highly indicative of a successful outcome and a good fit. Accordingly, a maximum weight may be appropriate for students that changed academic program. The maximum weight may be used to tailor the model to be more likely to recommend the academic program to the target student when previous students that share characteristics associated with the target student completed the academic program.

In some embodiments, if the previous student dropped out, then the academic program recommendation engine discards the previous student (Operation 318). The system may refrain from using drop-outs in the model, as dropping out may correlate more highly with other factors, such as financial difficulties and personal problems, compared to whether or not the student was enrolled in the appropriate academic program.

In some embodiments, if the previous student neither changed academic program, completed the academic program, nor dropped out, then the academic program recommendation engine assigns a medium weight for the previous student (Operation 316). Students that neither changed academic program, completed the academic program, nor dropped out may include, for example, students that are still enrolled in the academic program and/or students that completed the academic program outside of a threshold time period. Students that neither changed academic program, completed the academic program, nor dropped out may further include students that transferred to a different academic institution.

In some embodiments, the academic program recommendation engine computes a recommendation score for the academic program in relation to the target student (Operation 320). The recommendation score is based on the weighted previous students. The academic program recommendation engine may use the weighted previous students to generate a mathematical model yielding the recommendation score. As an example, for each student that (a) shares one or more characteristics with the target student and (b) completed a communications degree program, the target student's recommendation score for the communications degree program is incremented by five. For each student that (a) shares one or more characteristics with the target student and (b) changed from communications degree to another academic program, the target student's recommendation score for the particular academic program is incremented by one.

Alternatively, or additionally, the academic program recommendation engine may weight specific characteristics that target the student shares with a set of students that have been successful in an academic program. Attributes more strongly correlated with success may be weighted more heavily than other attributes. As an example, the academic program recommendation engine determines that courses completed by a student and the student's GPA have a strong correlation with completing a particular academic program within five years. High school subjects completed by the student and student interests have a weak correlation with completing the academic program within five years. Accordingly, the academic program recommendation engine weights courses completed at the institution and GPA more heavily than high school subjects completed and student interests, for the recommendation score computation.

In some embodiments, the academic program recommendation engine may update the recommendation score based on employment data associated with an academic program. As an example, the academic program recommendation engine determines that employment rates and average salary are higher for graduates with a kinesiology degree than for graduates with a health administration degree. Accordingly, the academic program recommendation engine assigns kinesiology a higher recommendation score than health administration.

Alternatively, or additionally, the academic program recommendation engine may increment or decrement the recommendation score based on completion requirements for the target student. The system may determine whether a target student has satisfied the completion requirements by analyzing data stored to the student information repository. As an example, the academic program recommendation engine may determine, based on student data, that a student has completed sixteen required course credits for Academic Program A. The student has completed forty required course credits for Academic Program B. The system determines that the student has satisfied a greater number of completion requirements for Academic Program B than for Academic Program A. Accordingly, the system increments the recommendation score for Academic Program B. As another example, the academic program recommendation engine may update the recommendation score based on a projected amount of time that would be taken by the target student for completing an academic program. The system may assign a comparatively high recommendation score for a program in which a target student has one year remaining. The system may assign a comparatively low recommendation score for an academic program in which the target student has two years remaining.

Alternatively, or additionally, the academic program recommendation engine may increment or decrement the recommendation score based on financial information associated with the target student completing an academic program. As an example, the system may update the recommendation score based on a projected cost for the target student to complete the academic program. As another example, the system may update the recommendation score based on a debt that would be incurred by the target student for completing an academic program. If the projected debt exceeds a threshold debt value, the system may decrement the recommendation score.

In some embodiments, the academic program recommendation engine updates the model for computing recommendation scores based on refreshed data. As an example, the academic program recommendation engine may update the model based on the target student's outcome in the academic program. Subsequent to recommending an academic program for the target student, the system may determine that the target student enrolled in the academic program. If the target student dropped out of the academic program or changed to a different academic program, the system may modify the model. The system may decrement the recommendation score, for the academic program, for other students that share characteristics with the target student. If the target student completed the academic program, the system may increment the recommendation score, for the academic program, for other students that share characteristics with the target student.

The recommendation score may be based, in whole or in part, on the target student's likelihood of success in the academic program. A metric representing the likelihood of success may be determined using a model similar to those described above with respect to the recommendation score. The system may increment or decrement the likelihood of success metric to compute the recommendation score. As an example, the system computes a likelihood of success metric of fifty for a biology M.S. program for a target student. Based on coursework completed by the target student towards the biology M.S. program, the system increments the likelihood success metric by twenty-five to compute a recommendation score of seventy-five. Alternatively, the recommendation score may directly correspond to the likelihood of success metric. As an example, the likelihood of success metric equals the recommendation score equals forty.

In some embodiments, the academic program recommendation engine determines whether the recommendation score meets or exceeds a threshold value (Operation 322). The academic program recommendation engine may identify a stored threshold value. The academic program recommendation engine compares the recommendation score to the threshold value.

In some embodiments, if the recommendation score meets or exceeds the threshold value, then the academic program recommendation engine recommends the academic program for the target student (Operation 324). The system may recommend the academic program to a student or counselor via the academic program recommendation interface, as described in detail with respect to FIG. 4. Alternatively, or additionally, the system may display recommended programs via a virtual assistant. Alternatively, or additionally, the system may recommend academic programs by transmitting a notification, such as email, text message, or voice message.

In some embodiments, if the recommendation score does not meet or exceed the threshold value, then the academic program recommendation engine refrains from recommending the academic program for the target student (Operation 326). The system may refrain from displaying any academic programs which are not recommended for the target student.

The following detailed example illustrates operations in accordance with one or more embodiments. The following detailed example should not be construed as limiting the scope of any of the claims. The system identifies a target student, Chris Sanchez, as having a low GPA in Chris's current major, Chemical Engineering. Accordingly, the system prepares to identify other majors in which Chris is more likely to succeed.

The academic program recommendation engine identifies a set of characteristics associated with Chris. The identified characteristics include academic statistics, financial information, personal information, and employment information. The characteristics include GPA. Chris has a 2.8 GPA at the current institution and had a 3.9 GPA in high school. The characteristics include information about financial aid available to Chris. Chris has a scholarship which will expire after four years of attendance, bringing Chris's cost of attendance to $5,000 per year if he graduates within four years. The characteristics include courses which Chris has completed. The characteristics further include a set of Chris's interests, obtained from a voluntary interest survey Chris submitted to Chris's current college.

The academic program recommendation engine identifies a set of previous students that (a) share one or more of the identified characteristics with Chris and (b) have enrolled in an academic program. The system identifies students that enrolled in a chemistry B.S. program. The system identifies a set of a hundred fifty prior students that share at least one of the identified characteristics with Chris and enrolled in the chemistry B.S. program.

For each of the prior students, the system determines whether the student changed academic program, completed the academic program, or dropped out. Sixty-one prior students enrolled in the chemistry B.S. program and completed the program. Nine prior students enrolled in the chemistry B.S. program and dropped out. Forty-five prior students enrolled in the chemistry B.S. program and changed to a different academic program. Thirty-five students enrolled in the chemistry B.S. program and are either still enrolled in the chemistry B.S. program or transferred to a different school with analogous field of study.

The academic program recommendation engine assigns a weight to each of the previous students, based on whether the students changed academic program, completed the academic program, dropped out, or none of the above. Students that changed academic program are assigned a relatively low weight of one. Students that completed the academic program are assigned a relatively high weight of ten. Students that dropped out are discarded. Students that neither changed academic program, completed the academic program, nor dropped out are assigned a medium weight of four.

The academic program recommendation engine computes an initial recommendation score based on the weighted prior students. The score is equal to the normalized sum of the number of students with a particular weight times that weight:

$$S_1 = \frac{1 \times N_C + 10 \times N_G + 4 \times N_O}{N_{TOT}}$$

where $S_1$ is the initial recommendation score, $N_C$ is the number of students that changed academic program, $N_G$ is the number of students that completed the academic program, $N_O$ is the number of students that neither changed academic program, completed the academic program, nor dropped out, and $N_{TOT}$ is the total number of prior students in the set. The initial recommendation score is equal to:

(1×45+10×61+4×35)/150=5.3.

The initial recommendation score is updated based on course and non-course requirements completed by Chris that apply to the chemistry B.S. program. Chris has completed forty units that count toward the chemistry B.S. program, out of one hundred seventy total units required to complete the degree program. Because Chris has completed many courses required for the chemistry B.S. program, the initial recommendation score is incremented by 1.5 points, to arrive at an updated recommended score of 6.8.

The updated recommendation score is incremented based on employment data associated with the chemistry B.S. program. The system determines that, within nine months of graduation, eighty percent of graduates in the chemistry B.S. program are employed in jobs related to chemistry. Accordingly, the system increments the updated recommendation score by 1 point, computing a final recommendation score of 7.8.

The system identifies a threshold value for recommending an academic program. The threshold value is 6.2. The system compares the final recommendation score for Chris, 7.8, to the threshold value, 6.2. The system determines that the final recommendation score for Chris exceeds the threshold value. Because the final recommendation score for Chris exceeds the threshold value, the system recommends the chemistry B.S. program to Chris. The system recommends the program by displaying the chemistry B.S. program in the academic program recommendation interface, in a list of recommended academic programs.

5. Displaying Recommended Academic Programs

Figure 4:
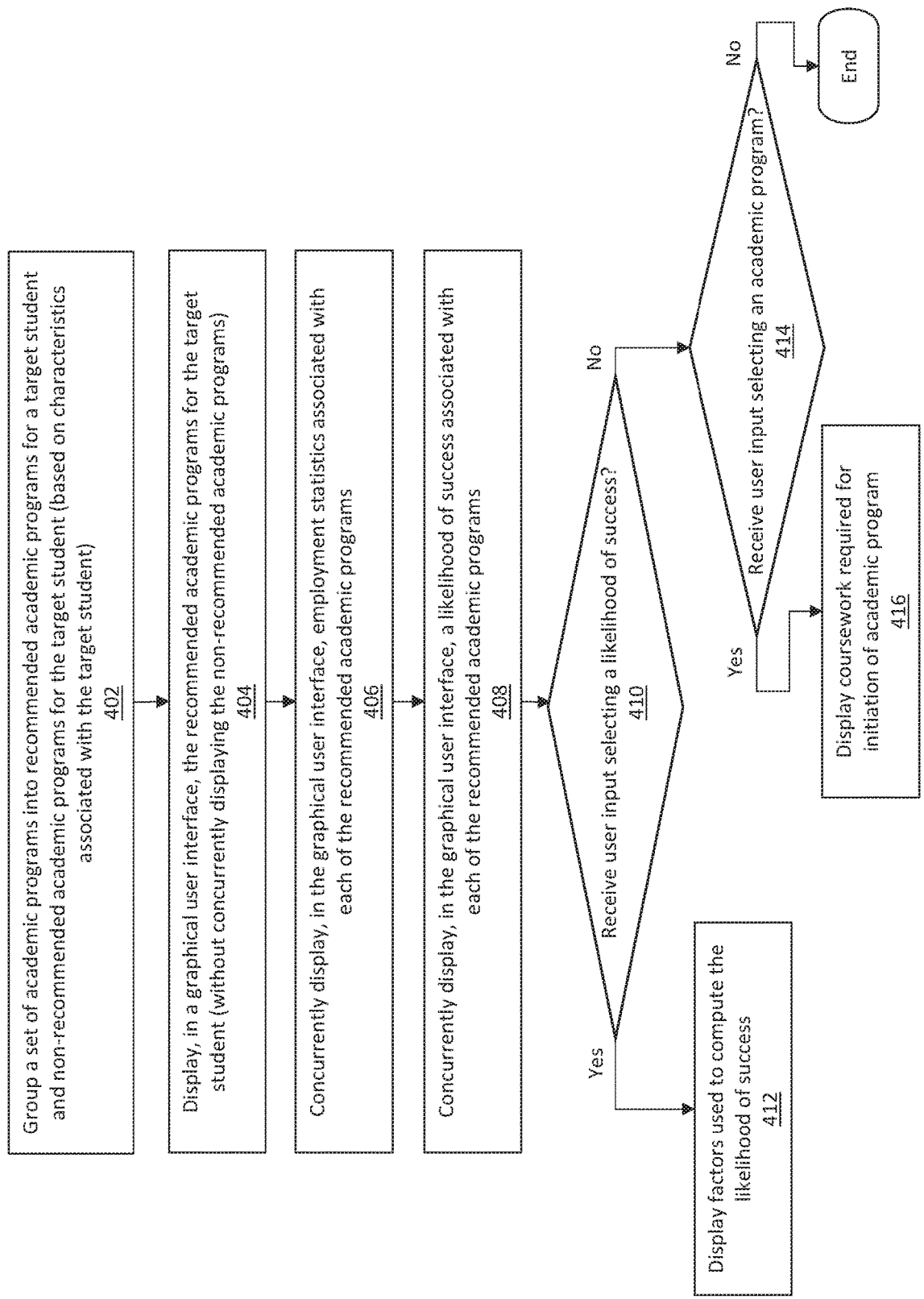
FIG. 4 illustrates example operations for displaying recommended programs via the academic program recommendation in accordance with one or more embodiments.

FIG. 4 illustrates an example set of operations for displaying recommended academic programs in accordance with one or more embodiments. One or more operations illustrated in FIG. 4 may be modified, rearranged, or omitted altogether. Accordingly, the particular sequence of operations illustrated in FIG. 4 should not be construed as limiting the scope of one or more embodiments.

In some embodiments, the academic program recommendation engine groups a set of academic programs into recommended programs for a target student and non-recommended academic programs for the target student (Operation 402). The academic program recommendation engine may identify recommended and non-recommended programs as described above with respect to FIG. 3.

In some embodiments, the academic program recommendation interface displays the recommended programs for a target student without concurrently displaying the non-recommended academic programs for the target student (Operation 404). The academic program recommendation interface may display a list of recommended academic programs for the target student, as described in detail above with respect to FIGS. 2A-2C.

In some embodiments, the academic program recommendation interface concurrently displays employment statistics associated with each of the recommended academic programs (Operation 406). The academic program recommendation interface may display employment statistics including a job market rating, an employability rating, and an average salary, as described in detail above with respect to FIGS. 2A-2C. The academic program recommendation interface may display employment statistics such as a percentage of graduates of an academic program employed within a period after graduation. For example, the interface displays the statistic "forty percent employed within nine months" in association with a communications A.A. degree program.

In some embodiments, the academic program recommendation interface concurrently displays a likelihood of success associated with each of the recommended academic programs (Operation 408). The academic program recommendation interface may display the success likelihood, for each recommended academic program, qualitatively (e.g., Success Likelihood=High) and/or quantitatively (e.g., Success Likelihood=ninety).

In some embodiments, the academic program recommendation interface receives user input selecting a likelihood of success (Operation 410). As examples, the system may detect that a user has clicked on, or hovered over, text or a button representing the likelihood of success.

In some embodiments, the academic program recommendation interface displays factors used to compute the likelihood of success (Operation 412). The system may identify the factors used to compute the likelihood of success based on the model used to recommend the academic program to the student. As an example, the system identifies four factors that were weighted most heavily in the model used to recommend a Health Science B.S. program to a target student. The system displays the four identified factors: "Interest Survey," "Time to Graduation," "GPA," and "Courses Completed."

In some embodiments, the academic program recommendation interface receives user input selecting an academic program (Operation 414). As examples, the system may detect that a user has clicked on, or hovered over, text or a button representing the academic program.

In some embodiments, the academic program recommendation interface displays specific coursework required for initiation of the academic program. (Operation 416). The system may identify pre-requisite courses that are required for a student to declare a major. As an example, the system identifies course requirements that are prerequisite for declaring a health science major. The system displays the course requirements: "English composition (two courses)" and "Mathematics (one course). As another example, the system may identify pre-requisite courses that are required for a student to enroll in a certificate program.

The following detailed example illustrates operations in accordance with one or more embodiments. The following detailed example should not be construed as limiting the scope of any of the claims. The system identifies a target student, Chris Sanchez. Chris has not declared a major. Based on characteristics associated with Chris, such as Chris's completed coursework, grades, and personal interests, the system identifies a set of courses recommended for Chris. Chris has been taking health-related courses. Accordingly, the system recommends four health-related academic programs for Chris: health science, B.S.; kinesiology, B.S.; health administration, Bachelor of Arts (B.A.); and human development, A.A.

The system displays, to Chris, the academic program recommendation interface in comparison view. The system displays a list of the four academic programs recommended for Chris. Additionally, the system displays detailed information about each of the four academic programs recommended for Chris. The detailed information includes Chris's units completed towards the academic program. For the health science, B.S. program, the system displays "17/120 Units Completed," indicating that Chris has completed seventeen of the one hundred twenty course requirements for the health science B.S. program. Similarly, the system displays 12/120 units completed for kinesiology, B.S.; 11/120 units completed for health administration, B.A., and 7/70 units completed for human development, A.A.

Additionally, the system displays employment statistics associated with each of the recommended academic programs. The system displays a job market rating for each of the recommended academic programs. The job market rating indicates the amount of available jobs associated with the academic program. For health science, B.S., the system displays "Job Market: Medium." For kinesiology, B.S., the system displays "Job Market: Hot." For health administration, B.A. and human development, A.A., the system displays "Job Market: Medium." The system further displays an employability rating for each of the recommended academic programs. The employability rating indicates the employment rates for graduates of the academic program. For health science, B.S. and kinesiology, B.S., the system displays "Employability: High." For health administration, B.A. and human development, A.A., the system displays "Employability: Medium." The system further displays an average salary for each of the recommended academic programs. For health science, B.S., the system displays "Average Salary: $50,000." For kinesiology, B.S., the system displays "Average Salary: $80,000." For health administration, B.A., the system displays "Average Salary: $60,000." For human development, A.A., the system displays "Average Salary: $60,000."

Additionally, the system displays a likelihood of success associated with each of the recommended academic programs. The likelihood of success represents a likelihood that Chris will complete the academic program within four years, and obtain employment after completing the academic program. The system displays a success likelihood for each of the recommended academic programs. For health science, B.S., the system displays "Success Likelihood: High." For kinesiology, B.S., the system displays "Success Likelihood: High." For health administration, B.A., the system displays "Success Likelihood: High." For human development, A.A., the system displays "Success Likelihood: Low."

Chris clicks on "Success Likelihood" in the health science, B.S. entry. The academic program recommendation interface transitions to the success-factors view. In the success-factors view, a pop-up window is displayed with information about success factors that contributed to the determination that Chris has a high likelihood of success in the health science, B.S. program. Factors that had a very positive impact on the determination are displayed in green: related courses, GPA, cost to graduation, and interest survey. Factors that had a positive impact on the determination are displayed in yellow: courses used and progress. A factor that had a negative impact on the determination is displayed in red: high school subjects.

Chris clicks on "Admission Requirements" in the health science, B.S. entry. The academic program recommendation interface transitions to the requirements view. In the requirements view, a pop-up window is displayed with information about courses that Chris must complete prior to declaring a health science major for the B.S. program. The interface displays a list of requirements: English composition (two courses), Mathematics (one course), and ten semester units.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

based on a set of characteristics associated with a target student:

determining a first recommendation score associated with recommending a first academic program of a plurality of academic programs to the target student;

determining a second recommendation score associated with recommending a second academic program of the plurality of academic programs to the target student;

identifying a first threshold value associated with the first academic program;

comparing the first recommendation score to the first threshold value associated with the first academic program;

responsive to determining that the first recommendation score meets the first threshold value:
grouping the first academic program into a plurality of recommended academic programs;

identifying a second threshold value associated with the second academic program;

comparing the second recommendation score to the second threshold value associated with the second academic program, wherein the first threshold value and the second threshold value are different;

responsive to determining that the second recommendation score does not meet the second threshold value:
grouping the second academic program into a plurality of non-recommended academic programs;

concurrently displaying, in a first window in a graphical user interface, for the target student:
the plurality of recommended academic programs, without concurrently displaying the plurality of non-recommended academic programs;

responsive to receiving user input selecting an interface element associated with the first academic program:
displaying, in a pop-up window over the first window in the graphical user interface, a set of factors used to compute the first recommendation score.

2. The medium of claim 1, wherein the operations further comprise:
further concurrently displaying, in the first window in the graphical user interface, respective recommendation scores associated with recommending each of the plurality of recommended academic programs to the target student.

3. The medium of claim 1, wherein the operations further comprise:
further concurrently displaying, in the first window in the graphical user interface, respective employment statistics associated with each of the plurality of recommended academic programs.

4. The medium of claim 3, wherein the employment statistics comprise an employability of the target student in a field associated with each of the plurality of recommended academic programs.

5. The medium of claim 3, wherein the employment statistics comprise job market information corresponding to a field associated with each of the plurality of recommended academic programs.

6. The medium of claim 1, wherein the operations further comprise concurrently displaying, for each of the plurality of recommended academic programs, one or more of:
an estimated time for the target student to graduate, based on the set of characteristics associated with the target student, for each of the plurality of recommended academic programs;

an estimated financial investment for the target student to complete each of the plurality of recommended academic programs;

an average time to complete each of the plurality of recommended academic programs;

a number of units needed to complete each of the plurality of recommended academic programs.

7. The medium of claim 1, wherein the operations further comprise:
responsive to receiving user input selecting a particular academic program, displaying specific coursework required for admission to the particular academic program.

8. The medium of claim 1, wherein:
the operations further comprise:
selecting a subset of students, from a plurality of students that enrolled in a particular academic program, based on the subset of students sharing one or more of the set of characteristics associated with the target student;

determining a respective outcome, of a plurality of possible outcomes, associated with each of the subset of students, the plurality of possible outcomes comprising two or more of: (a) changing to a different academic program, (b) dropping out of an academic institution, (c) completing the particular academic program;

based on the respective outcomes associated with each of the subset of students, computing a recommendation score for the particular academic program in relation to the target student;

responsive at least to determining that the recommendation score meets or exceeds a threshold value, grouping the particular academic program into the plurality of recommended academic programs for the target student;

computing the recommendation score of the particular academic program in relation to the target student is further based on: determining whether students that completed the particular academic program obtained employment associated with the particular academic program;

computing the recommendation score is further based on one or more of:
a debt that would be incurred by the target student for completing the particular academic program;
an amount of time that would be taken by the target student for completing the particular academic program;
progress already made by the target student in the particular academic program;
an amount of financial aid available to the target student;
personal data associated with the target student;
employment data associated with the particular academic program;
a likelihood of success for the target student in the particular academic program;

the operations further comprise:
subsequent to recommending the particular academic program for the target student, determining that (a) the target student enrolled in the particular academic program, and (b) that the target student either dropped out of the academic institution or changed to a different academic program;

responsive at least to determining that the target student either dropped out of the particular academic program or changed to a different academic program:
modifying a model for computing recommendation scores for the particular academic program;

the first recommendation score is determined based on one or more of:
  student Grade Point Average (GPA);
  an expected expense for the target student to complete remaining requirements for the particular academic program;
  student hiring data;
  salary data;
  student graduation rates;
  student browser history;
the operations further comprise:
  responsive to determining that the target student is (a) enrolled in an academic program different than the particular academic program and (b) not performing according to a minimum performance criterion: presenting a notification indicating that the particular academic program is recommended for the target student;
  determining a set of academic units required for completion of the particular academic program;
  determining a number of academic units completed by the target student, of the set of academic units required for completion of the particular academic program;
  wherein the recommendation score is further based on the number of academic units completed by the target student, of the set of academic units required for completion of the particular academic program;
the employment statistics comprise one or more of: salary statistics, an employability of the target student in a field associated with each of the plurality of recommended academic programs, and job market information corresponding to a field associated with each of the plurality of recommended academic programs;
the operations further comprise:
  concurrently displaying, in the graphical user interface, respective recommendation scores associated with each of the plurality of recommended academic programs;
  concurrently displaying, for each of the plurality of recommended academic programs, one or more of:
    an estimated time for the target student to graduate, based on the set of characteristics associated with the target student, for each of the plurality of recommended academic programs;
    an estimated financial investment for the target student to complete each of the plurality of recommended academic programs;
    an average time to complete each of the plurality of recommended academic programs; or
    a number of units needed to complete each of the plurality of recommended academic programs; and
  responsive to receiving user input selecting the particular academic program, displaying specific coursework required for initiation of the particular academic program.

9. A system, comprising:
one or more devices, each including at least one hardware processor;
the system being configured to perform operations comprising:
based on a set of characteristics associated with a target student:
  determining a first recommendation score associated with recommending a first academic program of a plurality of academic programs to the target student;
  determining a second recommendation score associated with recommending a second academic program of the plurality of academic programs to the target student;
identifying a first threshold value associated with the first academic program;
comparing the first recommendation score to the first threshold value associated with the first academic program;
responsive to determining that the first recommendation score meets the first threshold value:
  grouping the first academic program into a plurality of recommended academic programs;
identifying a second threshold value associated with the second academic program;
comparing the second recommendation score to the second threshold value associated with the second academic program, wherein the first threshold value and the second threshold value are different;
responsive to determining that the second recommendation score does not meet the second threshold value:
  grouping the second academic program into a plurality of non-recommended academic programs;
concurrently displaying, in a first window in a graphical user interface, for the target student:
  the plurality of recommended academic programs, without concurrently displaying the plurality of non-recommended academic programs;
responsive to receiving user input selecting an interface element associated with the first academic program:
  displaying, in a pop-up window over the first window in the graphical user interface, a set of factors used to compute the first recommendation score.

10. A method, comprising:
based on a set of characteristics associated with a target student:
  determining a first recommendation score associated with recommending a first academic program of a plurality of academic programs to the target student;
  determining a second recommendation score associated with recommending a second academic program of the plurality of academic programs to the target student;
identifying a first threshold value associated with the first academic program;
comparing the first recommendation score to the first threshold value associated with the first academic program;
responsive to determining that the first recommendation score meets the first threshold value:
  grouping the first academic program into a plurality of recommended academic programs;
identifying a second threshold value associated with the second academic program;
comparing the second recommendation score to the second threshold value associated with the second academic program, wherein the first threshold value and the second threshold value are different;
responsive to determining that the second recommendation score does not meet the second threshold value:
  grouping the second academic program into a plurality of non-recommended academic programs;
concurrently displaying, in a first window in a graphical user interface, for the target student:
  the plurality of recommended academic programs, without concurrently displaying the plurality of non-recommended academic programs;

responsive to receiving user input selecting an interface element associated with the first academic program: displaying, in a pop-up window over the first window in the graphical user interface, a set of factors used to compute the first recommendation score;

wherein the method is performed by one or more devices, each including at least one hardware processor.

11. The medium of claim 1, wherein displaying, in the pop-up window over the first window in the graphical user interface, the set of factors used to compute the first recommendation score comprises:

determining a plurality of factors used to compute the first recommendation score, the plurality of factors including the set of factors and a second set of factors;

determining that the set of factors are more determinative, than the second set of factors, in computing the first recommendation score;

displaying the set of factors in the pop-up window, without displaying the second set of factors in the pop-up window.

12. A non-transitory computer readable medium comprising instructions which, when executed by one or more hardware processors, cause performance of operations comprising:

based on a set of characteristics associated with a target student, the set of characteristics comprising courses that are completed by the target student:
determining respective recommendation scores associated with recommending each of a plurality of academic programs to the target student;

based on the respective recommendation scores associated with recommending each of the plurality of academic programs:
grouping, for the target student, each of the plurality of academic programs into one of (a) a plurality of recommended academic programs or (b) a plurality of non-recommended academic programs;

concurrently displaying, in a first window in a graphical user interface for the target student:
the plurality of recommended academic programs, without concurrently displaying the plurality of non-recommended academic programs; and
a respective number of a respective subset of the courses that are completed by the target student that do not count towards each of the plurality of recommended academic programs;

responsive to receiving user input selecting an interface element associated with a recommended academic program of the plurality of recommended academic programs: displaying, in a pop-up window over the first window in the graphical user interface, a set of factors used to compute a recommendation score for the recommended academic program.

13. The medium of claim 12, wherein displaying, in the pop-up window over the first window in the graphical user interface, the set of factors used to compute the recommendation score comprises:

determining a plurality of factors used to compute the recommendation score, the plurality of factors including the set of factors and a second set of factors;

determining that the set of factors are more determinative, than the second set of factors, in computing the recommendation score;

displaying the set of factors in the pop-up window, without displaying the second set of factors in the pop-up window.

14. The medium of claim 12, wherein the operations further comprise:

further concurrently displaying, in the first window in the graphical user interface for the target student: a respective number of a subset of the courses that are completed by the target student that are applicable towards completing each of the plurality of recommended academic programs.

15. The medium of claim 12, wherein the operations further comprise:

further concurrently displaying, in the first window in the graphical user interface for the target student: a respective number of units that are completed by the target student and not applicable towards completing each of the plurality of recommended academic programs.

16. The medium of claim 1, wherein identifying a first threshold value associated with the first academic program comprises:

determining that the first academic program is within a first academic program grouping of a plurality of academic program groupings;

determining that the first academic program grouping is associated with the first threshold value.

17. The medium of claim 1, wherein the first academic program and the second academic program are offered by a same academic institution.

18. The medium of claim 1, wherein the operations further comprise:

determining respective salary information associated with each of the plurality of recommended academic programs;

determining an order of the plurality of recommended academic programs based on the respective salary information;

concurrently displaying the plurality of recommended academic programs in the determined order.

19. The medium of claim 1, wherein the operations further comprise:

displaying, in the pop-up window over the first window in the graphical user interface, a visualization associated with a factor of the set of factors indicating that the factor is associated with a negative influence in computing the first recommendation score.

20. The medium of claim 12, wherein the operations further comprise:

displaying, in the pop-up window over the first window in the graphical user interface, a visualization associated with a factor of the set of factors indicating that the factor is associated with a negative influence in computing the recommendation score.

* * * * *